April 28, 1936.  R. S. WAUGH ET AL  2,039,135
LANDING GEAR FOR AEROPLANES
Filed May 11, 1931
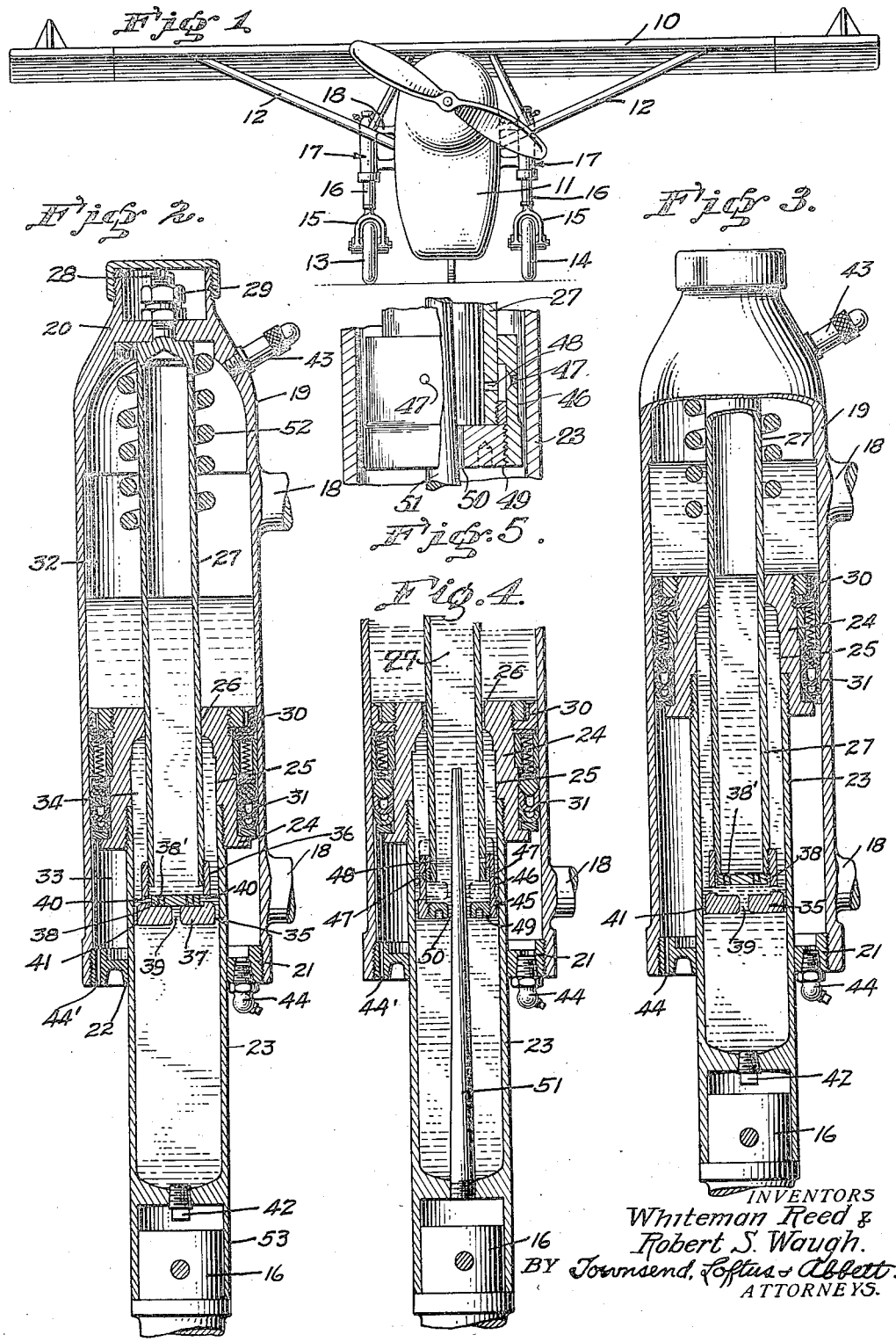
INVENTORS
Whiteman Reed &
Robert S. Waugh.
BY Townsend, Loftus & Abbett.
ATTORNEYS.

Patented Apr. 28, 1936

2,039,135

UNITED STATES PATENT OFFICE 2,039,135

LANDING GEAR FOR AEROPLANES

Robert S. Waugh, Alhambra, and Whiteman Reed, Huntington Park, Calif., assignors, by mesne assignments, to The Cleveland Pneumatic Tool Company, Cleveland, Ohio, a corporation of Ohio Application May 11, 1931, Serial No. 536,566

3 Claims. (Cl. 267—64)

This invention relates to aeroplane construction and particularly pertains to a landing gear therefor.

In the design of aeroplanes it has been common practice to interpose resilient means between the landing gear of the plane and the fuselage to absorb impact and recoil forces which would otherwise be imparted to the body of the aeroplane incident to landing or taxying, and it is the principal object of the present invention to provide fluid pressure means for absorbing the force imparted to an aeroplane landing gear at the time of landing and recoil force as the aeroplane taxies across the field.

The present invention contemplates the provision of a shock absorbing unit adapted to be interposed between the running gear and the fuselage of an aeroplane and within which unit is incorporated fluid and hydraulic compression means for dissipating impact energy delivered to the plane, as well as resisting recoil force.

The invention is illustrated by way of example in the accompanying drawing in which:

Figure 1 is a view in front elevation showing an aeroplane equipped with the present invention.

Fig. 2 is an enlarged view in central vertical section showing one of the shock absorbing units in its distended position.

Fig. 3 is an enlarged view similar to Fig. 2 showing the shock absorbing unit in its contracted position.

Fig. 4 is an enlarged fragmentary view in central vertical section showing the modified form of the invention in which a choke pin is incorporated.

Fig. 5 is a detailed view, partly in section, of a portion of the structure illustrated in Fig. 4, with the valve in the position which it occupies upon the impact stroke.

Referring more particularly to the drawing, 10 indicates the wing structure of an aeroplane here shown as mounted upon a fuselage 11 and suitably held by reinforcing struts 12. Appropriately positioned at the opposite sides of the fuselage are landing wheels 13 and 14 here shown as provided with forks 15, which extend vertically and have a center shaft 16 directly connected with one element of a landing gear shock absorber 17, with which structure the present invention is particularly concerned. The shock absorbing unit is rigidly secured to the sides of the fuselage by fastening members 18. These members are formed integral with or secured to the wall of an upper cylinder 19 which has a closed upper end 20 and a downwardly projecting cylindrical body substantially uniform in diameter, and the lower end of which is closed by a packing wall 21 which is externally threaded and is screwed into the mouth of the cylinder 19. The packing wall 21 is formed with a central opening 22 through which a lower cylinder 23 extends and reciprocates. This lower cylinder is tubular and projects upwardly to terminate in an externally threaded end which is screwed into the central bore of an upper piston 24. The piston is formed with a counterbore portion 25 in communication with the interior of the tubular lower cylinder 23 and which terminates at its upper end in a cylindrical opening 26 through which a check tube 27 extends and reciprocates. The check tube 27 is axially aligned with relation to the upper cylinder 19 and is held in rigid relation to this cylinder by a threaded screw 28 formed as a continuation of its upper end and passing through the cylinder wall 20 where it is held by a nut 29. The outer piston 24 is provided with a cup packing 30 and a special arrangement of labyrinth packing 31 which will prevent interchange of fluid around the outer piston 24 and between the upper compartment 32 of the upper cylinder 19 and the lower compartment 33 of the same cylinder.

The check tube 27 is of a diameter considerably smaller than the counterbore 25 in the piston 24 and the inside diameter of the lower cylinder 23, thus forming a liquid compartment 34 around the check tube 27 and within the space defined by the wall of the counterbore 25 and the wall of the lower cylinder 23. The lower end of the compartment 34 is defined by an inner piston 35 which is in the shape of a cylindrical cap screwed on to the lower end of the check tube 27 and thus accommodates a disc shaped valve member 38 which is mounted within the inner piston 35 and may oscillate for a distance determined by the thickness of the valve member 38 and a distance between the upper face of the end 37 of the piston and the lower face of the check tube 27. A bypass opening 39 is formed in the end wall 37 and a plurality of bypass openings 40 are formed through and are distributed around the cylindrical portion 36 of the inner piston 35. Attention is also directed to the fact that the outside diameter of the portion 37 of the inner piston 35 is slightly less than the inside diameter of the lower cylinder 23, thus providing an annular bypass 41 to permit the lower cylinder 23 to gradually settle as the shock absorber is distended and while the load has been removed therefrom.

The lower cylinder 23 and the portion of the compartment 32 in the upper cylinder 19 are filled with an incompressible fluid such as oil, which fluid may be drained from the device by the removal of a drain plug 42 disposed at the lower closed end of the lower cylinder 23. The portion of the compartment 32 in the upper cylinder 19 which is not filled with liquid is filled with a fluid under pressure, such for example as air delivered through the air valve 43. The compartment 33 beneath the piston 24 and within the cylinder 19 may be supplied with oil through a grease unit 44, and is also provided with a breather duct 44'.

In the construction as shown in Fig. 4 of the drawing, a different form of inner piston is provided, as indicated at 45. This piston is shown as comprising a reciprocating sleeve 46 into which the lower end of the check tube 27 extends, and which sleeve is mounted to have limited reciprocation with relation to the tube. Bypass openings 47 are formed through the side wall of this sleeve and may move to register with similar openings 48 formed in the tube 27, at which time fluid may pass through the sleeve 46 and the tube 27, and from the lower cylinder 23 into the check tube 27. The lower end of the piston 45 is fitted with a removable threaded wall structure 49 having a central opening 50 therethrough. Extending through this central opening is a tapered choke pin 51 which will cooperate with the opening 50 in the piston to progressively vary the effective passageway through the opening 50 and from the lower cylinder 23 into the piston 45.

As an emergency provision a helical spring 52 is provided for the purpose of preventing complete collapse of the shock absorber unit if the fluid leaks from it, as might be the case in warfare, and in which event the cylinders of the shock absorber might be punctured by a projectile. The spring 52 is secured in the upper end of the upper cylinder 19 and extends down around the check tube 27 for a distance. The lower end of the spring will be encountered by the upper face of the piston 24 under extreme telescoping conditions of the cylinders.

In operation of the present invention the shock absorbers are assembled as shown in the drawing, with the vertical spindle 16 rigidly secured within the sockets 53 at the lower ends of the lower cylinders 23. It will therefore be evident that these spindles may rotate around the vertical axes as occasion may require, having a castor effect. When the shock absorbers are thus assembled, a desired quantity of liquid is placed in them, after which air to a desired pressure is introduced through the air valve 43. When the aeroplane leaves the ground the weight of the wheels 13 and their forks 15 will pull downwardly on the lower cylinders 23, drawing the lower cylinder out of the upper cylinder until the lower face of the piston 24 strikes the end wall 21 of the upper cylinder, or until the fluid within the compartment 33 has acted to resist further downward movement of the lower cylinder 23 under influence of the weight of the wheel. This condition is illustrated in Fig. 2 of the drawing. When the aeroplane is landed its wheels will normally first strike the ground and force upwardly on the lower cylinder 23, simultaneously telescoping the lower cylinder 23 into the upper cylinder 24 and forcing the check tube 27 downwardly into the lower cylinder 23. The act of forcing the lower cylinder 23 upwardly into the cylinder 19 will cause the piston 24 to force against the incompressible fluid in the bottom of the compartment 32 and cause the air within the compartment 32 to be proportionately compressed. At the same time the inner piston 35 will be forced downwardly into the incompressible fluid within the lower cylinder 23, raising the disc valve 38 to the position illustrated in Fig. 3, permitting liquid to pass through restricted opening 39 in the piston and restricted openings 38' in the valve, and thus into the check tube. At the same time, the passage of liquid from the cylinder 23 into the annular chamber 34 is facilitated, because liquid may then flow through opening 39 and through bypass openings 40, as well as through the annular clearance space 41 around the periphery of the piston 35. When weight of the aeroplane has been completely imposed upon the shock absorbers and the landing force has been absorbed, it will be evident that the air in the compartment 32 of the cylinder 19 will be under compression and will act to provide a pneumatic cushion for the aeroplane while it taxies across the field. In the event that the cylinder 19 should spring a leak the compression of the air will be lost and the outer and inner cylinders would be telescoping until the upper face of the piston 24 would encounter the lower end of the spring 52, after which the aeroplane would be resiliently supported by the springs while it taxies.

On the rebound stroke the disc valve 38 will of course seat itself upon piston 35, thereby closing off the openings 39 and 38' as indicated in Fig. 2 and checking the flow of liquid out of the tube 27 back into the cylinder 23, the only path of flow then available being through the openings 40 and the annular clearance 41 around the periphery of the piston 35. This position of the valve piece 38 also serves to check the flow of liquid out of the annular chamber 34 into the cylinder 23, because at this time the path of flow out of the annular chamber through openings 40 and 39 is cut off.

In the form of the invention shown in Fig. 4, the flow of liquid from the cylinder 23 into the check tube 27 is relatively free at the beginning of the compression stroke, but becomes progressively less free as the tapered pin 51 gradually reduces the size of passage 50. On the compression stroke valve piece 45 takes the dotted line position, affording a bypass for liquid from the cylinder 23 into the annular chamber within the counterbore 25 through the passage 50 and ports 48 and 47, as well as through the annular clearance around the periphery of the valve. On the rebound stroke the valve piece 45 takes the full line position, limiting the flow out of the annular chamber around the check tube to the path provided by the clearance surrounding the valve piece 45. The action of this form of the invention is therefore similar to that of Figs. 2 and 3 except that the communication between the cylinder 23 and the tube 27 changes progressively on the compression and rebound strokes, and except that the communication between the cylinder 23 and the annular space around the check tube changes progressively on the compression stroke but not on the expansion or rebound stroke.

It will thus be seen that the structure here disclosed provides hydraulic means for normally receiving and absorbing impact landing force, and pneumatic means for absorbing minor vibration and impulses incident to the travel of the plane along the ground.

While we have shown the preferred form of our invention, as now known to us, it will be understood that various changes may be made in combination, construction, and arrangement of parts by those skilled in the art without departing from the spirit of our invention as claimed.

Having thus described our invention what we claim and desire to secure by Letters Patent is:

1. In a hydropneumatic strut, a pair of telescoping cylinders, the inner cylinder carrying a piston slidably contacting with the outer cylinder, a metering pin carried by one of said cylinders and a check tube carried by the other of said cylinders, said pin being concentric with said tube, and a partial closure for the inner end of said tube surrounding said pin, whereby the flow of incompressible fluid into and out of said tube is restricted, said tube carrying a valve opening into the inner cylinder which closes on the rebound stroke.

2. In a hydropneumatic strut, a pair of telescoping cylinders, the inner cylinder carrying a piston slidably contacting with the outer cylinder, a metering pin carried by one of said cylinders and a check tube attached at one end to the other of said cylinders, said pin being concentric with said tube, and a partial closure for the inner end of said tube surrounding said pin, whereby the flow of incompressible fluid into and out of said tube is restricted, said tube carrying at its free end a valve which closes on the rebound stroke.

3. In a hydropneumatic strut, a pair of upstanding telescoping cylinders, the inner cylinder carrying a piston slidably contacting with the outer cylinder, a check tube carried by the upper of said cylinders having communication at its lower end through said piston with the lower cylinder, means for varying the effective size of said communication during a given stroke as the stroke progresses, and a valve carried by said check tube opening on the compression stroke and closing on the expansion stroke for facilitating the flow of liquid through the tube on the compression stroke only.

WHITEMAN REED.
ROBERT S. WAUGH.